May 22, 1962 G. J. KNANDEL ET AL 3,036,150

TELEGRAPH SWITCHING SYSTEM

Filed Dec. 18, 1957 3 Sheets-Sheet 1

INVENTORS G. J. KNANDEL
J. A. KRECEK
BY John E. Cassidy
ATTORNEY

INVENTORS
G. J. KNANDEL
J. A. KRECEK
BY
John E. Cassidy
ATTORNEY

INVENTORS G. J. KNANDEL
J. A. KRECEK
BY John E. Cassidy
ATTORNEY 3,036,150

TELEGRAPH SWITCHING SYSTEM

George J. Knandel, Glen Rock, N.J., and Joseph A. Krecek, New Rochelle, N.Y., assignors to Bell Telephone Laboratories, Incorporated, New York, N.Y., a corporation of New York Filed Dec. 18, 1957, Ser. No. 703,594
12 Claims. (Cl. 178—2)

This invention relates to communications networks and particularly to multisystem telegraph networks including a plurality of systems having equipment for automatically directing and transmitting messages from a station of origin to a station of destination within each system or to foreign systems through one or more switching centers in accordance with and under the control of directing or address characters or code combinations preceding each message.

All patents and applications mentioned herein are hereby incorporated by reference as though fully set forth herein.

Systems of the nature to be considered are disclosed in Patent No. 2,766,318, granted to W. M. Bacon, G. J. Knandel, J. A. Krecek, and G. A. Locke on October 9, 1956, and in patent application Serial No. 394,339, filed November 25, 1953, by J. A. Krecek and G. A. Locke, now Patent No. 2,951,893, issued Sept. 6, 1960. This patent and application disclose systems capable of receiving messages from a plurality of stations and switching them in accordance with particular code combinations indicative of the stations to which they are to be routed. A station being any location, instrumentality, or device, capable of being activated by transmission thereto of code combinations representative thereof. In the event that a plurality of stations within a system are to receive a single message, means are provided in the form of a multiple address circuit for connecting all receiving circuits to a common transmitter so that the message may be simultaneously transmitted to all points.

The currently expanding communications art has found it necessary to interconnect systems such as those described in the aforementioned patent and application. These systems, as they exist today, are completely independent, having address designations suited to their own individual purposes and in no way dependent upon those of foreign systems. At present when it is deired to transmit a message from one system to another, it is necessary to treat that other system as being a single receiving point, transmitting the entire message thereto as a package. Upon receipt of the message at the foreign system it is recorded and processed to determine the destinations within that system to which it is directed. Subsequent to this operation it is retransmitted to those destinations.

An object of the present invention is the provision of a telegraph network comprising independenet yet interconnectable systems.

The similarity of addresses in already existing systems poses a considerable problem when two or more systems are interconnected. When a message is directed to a station in a particular system, which station has an address identical to that of a station in another interconnected system, means must be provided for insuring exclusive receipt of the message by the desired station. In this case, it is advantageous to effectively blind all other systems except the destination system during the transmission of address codes thereto.

Accordingly, another object of the present invention is the provision of a telegraph network wherein already existing independent telegraph systems may be interconnected without necessitating modification of already existing station codes.

A yet more specific object of the present invention is the provision of a multisystem telegraph network wherein identical station codes may be employed within the individual systems.

In order to provide a practical interconnecting link of the nature contemplated, it is advantageous to employ simple intersystem designations so that an operator at the transmitting station expends a minimum of time or energy in initiating a call. An aspect of this problem is the nature of the requirements as to the elements of the address; the intersystem directing codes, the sequence of specific codes necessary to properly direct the message, the effect of an error in addressing, and the compatibility of the operating procedure with previously existing procedures.

Further objects of the present invention are to provide standard coding procedures for intersystem messages, to place no restriction on the sequence of presentation of routing information pertaining to the various systems, and to provide for the interception of improperly addressed intersystem messages.

A yet further object of the present invention is to make possible the simultaneous transmission of messages to a plurality of systems, each of said systems containing stations to which the meassages are directed, the stations being individually selectable at the sending point.

The fundamental requirement of an invention such as that herein disclosed is that independent treatment be made possible for foreign system codes in order to prevent misinterpretation of them resulting in transmission of messages to local stations having identical codes. It may be noted at this point that the use of the word "local" is not to be taken in a geographical context, but rather in the sense of being an intrasystem connection as opposed to being an intersytem connection. The features of this invention are directed toward establishing such independent treatment.

A feature of the present invention is the provision of means in a telegraph system responsive to the reception of an intersystem code for connecting all subsequent codes to a foreign trunk until another intersystem code is received.

Another feature of the present invention is the provision of means in a telegraph system for blinding intrasystem outlets when address codes are being transmitted to foreign systems. From another aspect, the present invention provides means for diverting all following codes to a particular designated intersystem trunk when these codes are preceded by a code designating the intersystem trunk.

Still another feature of the present invention is the provision in a telegraph system of means individually associated with each system of a network, operative to initiate a bid for access to the outlet to any other system when the code representative thereof is received.

It is at times required to transmit the same message to more than one foreign system. The circuits of the present invention are arranged so that, when this is the case, the message is transmitted simultaneously to each of the foreign systems.

Another feature of the present invention is the provision of means for blinding the outlet to a first foreign system following transmission of a plurality of address codes thereto and for subsequently connecting to a second foreign system.

A still further feature of the present invention is the provision of means for addressing the messages to stations of the home system before addressing them to foreign systems.

The present invention is comprised basically of relay means for establishing paths from the apex of the final fan circuit in a multiple address circuit, such as that disclosed in Patent 2,766,318 or application Serial No. 394,339, filed November 25, 1953, directly to outlets connected to particular foreign systems. This connection is sufficiently isolated from the outlets of the home system to prevent interference therewith when stations in the foreign system have addresses identical to those of local stations.

The foregoing, as well as additional objects and features of this invention will be more clearly understood from the following description to be considered in connection with the drawings wherein.

Figure 2:
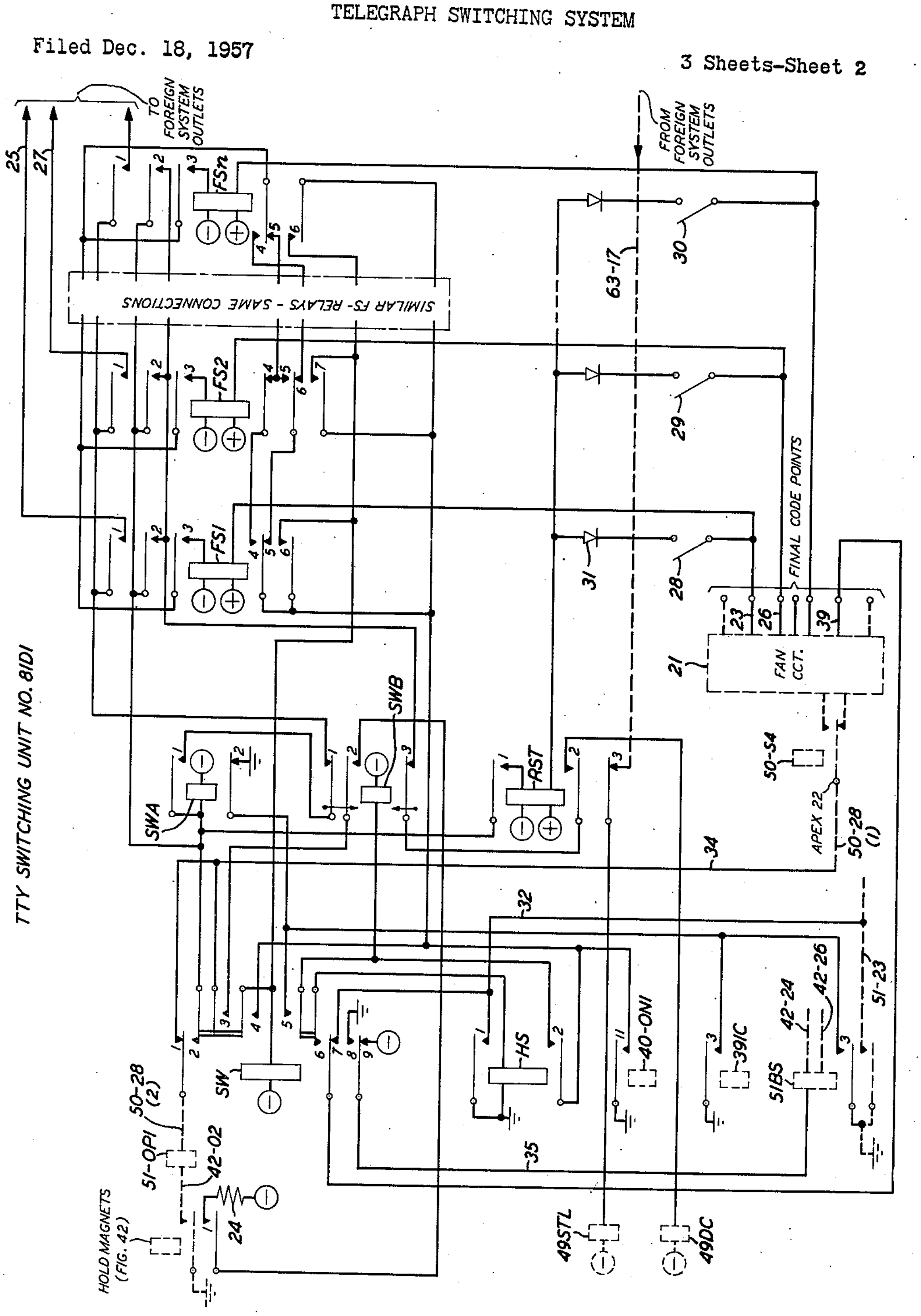
FIG. 2 is a circuit schematic of one embodiment of the present invention adapted to operate in conjunction with telegraph systems of the type disclosed in patent application Serial No. 394,339, filed November 25, 1953.
Figure 3:
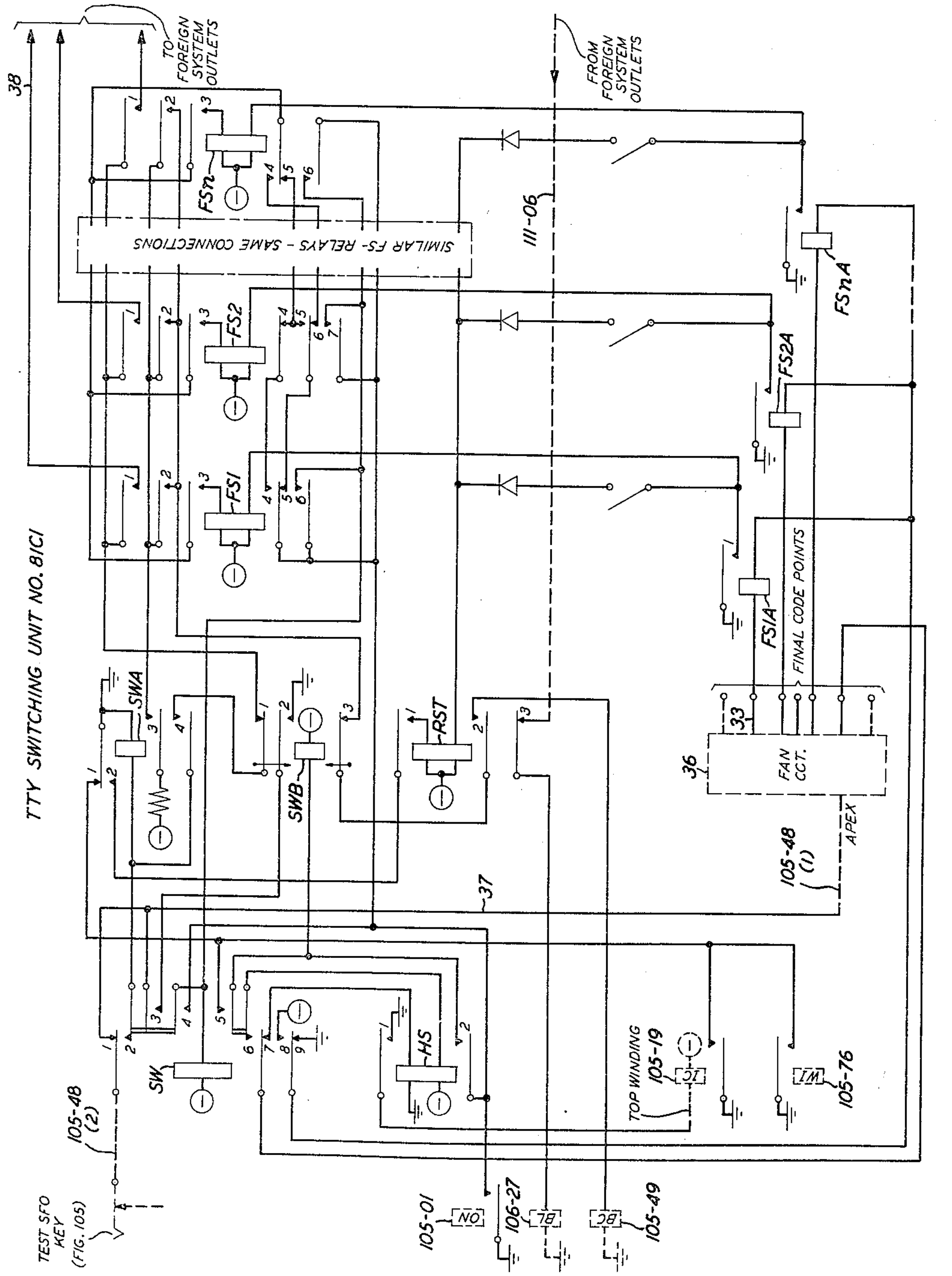
FIG. 3 is a circuit schematic of a second embodiment of the present invention adapted to operate in conjunction with telegraph systems of the type disclosed in Patent 2,766,318.

Referring to the figures, specifically FIGS. 2 and 3, it is to be understood that the elements depicted by dotted lines are elements present in the disclosures previously mentioned. The dotted elements in FIG. 2 are illustrative of elements disclosed in the Krecek-Locke application and the notation used is identical to that employed in the application. The same type of notation procedure has been employed in FIG. 3 of this invention, the reference disclosure, however, being that of the Bacon et al. Patent No. 2,766,318. It will be recognized that the actual contact configurations shown associated with these previously-disclosed relays may not exist in the previous disclosures. In order to permit the proper functioning of the circuits of this invention, these contacts must necessarily be added. Where such contact addition has been found necessary the added contacts and armatures are drawn in full line (not dotted), and the contacts are numbered as the next successive number to those appearing in the reference disclosure. For example, consider relay 51BS located in the lower left corner of FIG. 2 herein, and FIG. 51 of application Serial No. 394,339. In FIG. 2 relay 51BS is shown to be connected to two dotted leads, 42—24, and 42—26, and to a single full-line lead 35. In accordance with the convention adopted, this indicates that the dotted leads are disclosed in FIG. 51 of the above-cited application and lead 35 has been added by this invention. It will also be seen that two armatures appear in FIG. 2, one dotted and the other full-line. Both armatures are grounded, the mating contact of the dotted armature being connected to dotted lead 51—23 and the mating contact of the full-line armature being connected to a full-line lead. The full-line armature and lead have been added by this invention. Because in FIG. 51 two armatures are disclosed, one of which is reproduced herein, the armature added by this invention is designated "3."

For the sake of brevity, a detailed discussion of operation of the entire telegraph systems described by the aforementioned disclosures will not be reiterated here. Should such an analysis of the circuit be desired, the reader is directed to the patent and application for the complete operating details. The factors particularly relevant to the functioning of this invention will be referred to as the invention is completely described below.

Figure 1:
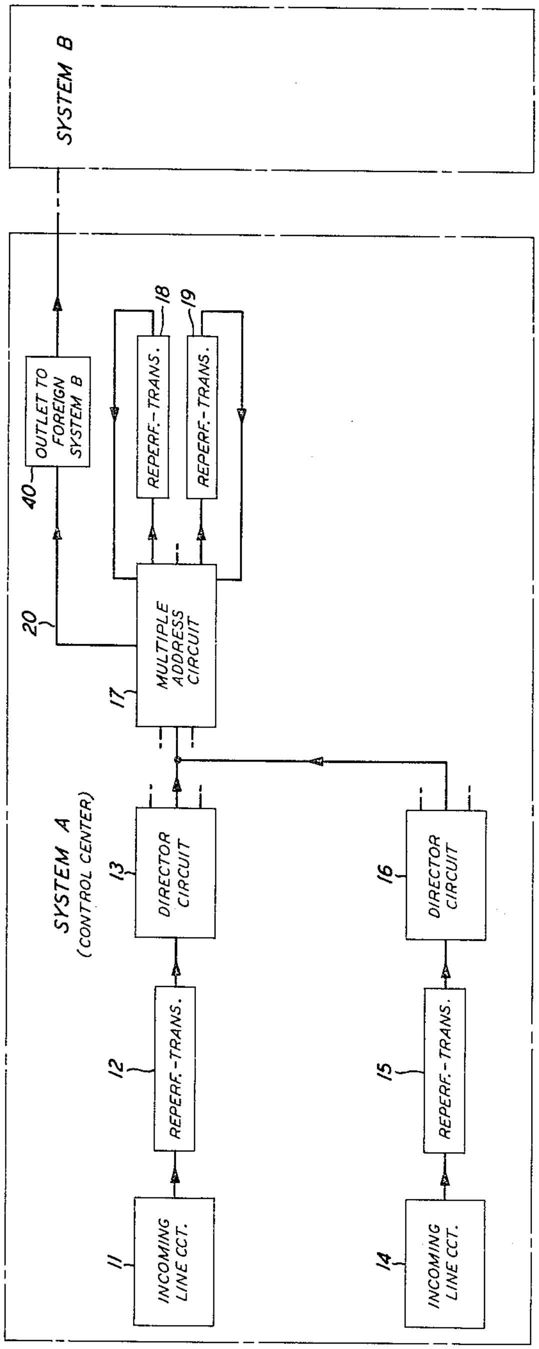
FIG. 1 is a block diagram illustrating the interconnection of two telegraph systems and showing typical receiving elements of a first system connected to the multiple address circuit thereof.

FIG. 1 illustrates two systems of a multisystem network. These systems may be of the type disclosed in the hereinbefore-mentioned patent and application. For simplicity of discussion, only one system has been shown in any detail and only those elements necessary to a complete understanding of this invention are depicted. Considering the control center of system A specifically, two incoming line circuits 11 and 14 are therein depicted. These circuits are generally located at a central office and receive signals transmitted from outlying stations or other central offices in the system. Assuming reception of a message preceded by an address code by incoming line circuit 11, the message and address code are recorded by reperforator-transmitter 12, and director circuit 13 interprets the coded address designation. In the event the message is of a multiple address nature, it is preceded by a code combination which directs it to the multiple address circuit. All messages within the purview of this invention are of this nature and therefore only the output from director circuit 13 to multiple address circuit 17 is shown. Within multiple address circuit 17 the address designations are interpreted and the proper outlets seized to permit retransmission of the entire message simultaneously to all receiving points. In operation the message with its directing codes is received by multiple address circuit 17, stored in a reperforator-transmitter level, e.g. 18 or 19, the addresses interpreted, all designated outlets seized, and the message then retransmitted to the outlets and subsequently over trunks to all receiving points. FIG. 1 shows foreign system outlet 40 associated with system B and trunk 20 connected thereto.

All of the elements thus far discussed have been completely disclosed in the aforementioned patent and application. This invention relates to an addition to the multiple address circuit whereby the trunk to a foreign system may be seized and complete address information for all stations within that system transmitted thereover and acted upon before the message is retransmitted over trunk 20.

To facilitate the operation of this invention, each system in the network is assigned an intersystem code which is used to route traffic to that system from other systems. The systems being considered herein are capable of handling 400 multiple address codes. It is therefore necessary to segregate a portion of these codes for exclusive intersystem use. Arrangement is made so that codes following the intersystem code are routed to the foreign system to be acted upon rather than to stations in the home system. By utilizing this arrangement, each system may use any of the remaining 400 codes available, the same code being operative in any or all of the interconnected systems.

To code a message, the originating operator, after the usual multiple address code, adds the home system codes, the intersystem code for the foreign system, the multiple address code for the foreign system, and the codes designating the receiving stations for which the message is intended in the foreign system. If desired, the message can be sent to a second foreign system by including a second intersystem code followed by the multiple address code and the desired individual station codes. If the message is to be sent to only one station in a foreign system, the multiple address code for the foreign system is omitted; that is, the individual code is inserted immediately after the intersystem code. This causes the message to be handled as a single address in the foreign system. After inserting codes for a second foreign system if it is desired to add more codes for the first foreign system, this may be done by again inserting the first foreign intersystem code and the added codes for that system. For reasons that will become evident from the following detailed description of operation, it is unnecessary to follow the second insertion of the intersystem code by the multiple address code. When all code addresses have been included, the permutation combinations defining Carriage Return, Line Feed, and Letters mark the end of the codes in the usual manner, after which the text of the message is transmitted to all connected receivers.

Commencing now with a more detailed description of this invention, by reconsidering FIG. 1 it will be understood that when a message is received at the home switching center over an incoming line, a single address director such as 13 or 16 routes it to the multiple address circuit 17, normally discarding the multiple address code. If the multiple address code is not discarded by the single address director, it is scanned and discarded by the multiple address director. Thereafter, the multiple address director scans and acts upon the home system codes in the normal manner connecting to the various outlets represented by those codes (including group codes) and then blinding them. A group code cannot consist of outlets in both the home and a foreign system because the multiple address circuit can act on a group code consisting only of home system outlets at this time as it has not yet been connected to a foreign system trunk.

As previously pointed out, the two illustrative embodiments of this invention differ in that they are adapted to cooperate with different systems which are described in the two disclosures identified in the foregoing. The philosophy of operation of these embodiments is identical, the difference lying primarily in the substitution of ground connections in FIG. 3 where D.C. potentials are applied in FIG. 2. This variation renders the invention compatible with the disclosure in Patent No. 2,766,318, wherein the final code points experience positive and negative polarities and with application Serial No. 394,339, filed November 25, 1953, wherein the final code points are grounded.

FIG. 2, the embodiment compatible with the above-identified patent application, will first be described. It should first be understood that the apex 22 of fan circuit 21, illustrated in FIGS. 41, 42, 43, 50, 51, 52, and 53 of the above-cited application, receives ground via contacts closed by hold magnets in FIG. 42 and the winding of relay 51–OP1. This apex is shown in FIG. 2 herein at the armature of relay 50–S4 and is identical to the bottom armature of relay 50–S4 shown in FIG. 50 of the application. Effectively, the switching apparatus of this invention is interposed between the apex of the fan and the ground normally applied thereto via the hold magnet contacts. This is illustrated in FIG. 2 herein where the conductor 50—28 is depicted as two parts, 50—28(1) and 50—28(2) interconnected by conductor 34 of this invention. As discussed in patent application Serial No. 394,339, filed November 25, 1953, the incoming codes set up the fan circuit to select a particular outlet out of 400 possibilities and subsequently ground is applied to cause operation of relays associated with that outlet.

After all home system outlets have been connected, assume that the intersystem code for foreign system No. 1 is scanned. The lead to the outlet for this system is designated "25" and appears at the upper right of FIG. 2 herein. In the fashion described by the hereinbefore cited patent application, fan circuit 21 is set up to connect apex 22 to final code point 23. When this connection is established, relay FS1 operates over a path from a positive potential, through its lower winding, final code point 23, apex 22, contacts 1 of relay SW, winding of relay 51–OP1 and the hold magnet contacts to ground. Relay FS1 locks through its upper winding via a one-and-one-only path through its own contacts 3, contacts 5 of relay FS*n*, intermediate contacts of similar FS relays, contacts 4 of relay FS2 and contacts 4 of relay FS1 to ground at contacts 11 of relay 40–ON1, which relay is in an operated condition whenever the multiple address director circuit is active, as is fully disclosed in the patent application hereinbefore cited. The ground appearing at contacts 11 of relay 40–ON1, is applied via contacts 6 of relay FS1 to relay SW which operates and locks to ground over its own contacts 4. Relay SW, in operating, cuts fan circuit 21 away from relay 51–OP1 at contacts 1, connecting the hold magnet ground to the winding of relay SWA via contacts 2 of relay SW thereby operating relay SWA due to the negative supply connected to its winding. This ground is thereby passed via contacts 1 of relay SWA, through contacts 1 of unoperated relay SWB, and contacts 1 of relay FS1 to lead 25, which is assigned to foreign system 1, making a bid for connection to that foreign system outlet. Operation of relay SW also closes a circuit to operate relay SWB, from negative potential, through its winding, contacts 5 of relay SW and contacts 2 of relay SWA to ground; but because relay SWB is a slow-to-operate relay and relay SWA is not, contacts 2 will be opened and relay SWB will remain unoperated. Although this delay feature is unimportant at this time, later discussion will illustrate its function.

When the outlet to foreign system No. 1 receives a bid, it responds in the usual manner closing the multiple address link and grounding lead 63—17 to the multiple address director. This operates relay 49 STL in that circuit, which causes transmission of subsequent codes as described in the above-cited application. It will be noted that lead 63—17 is now connected to relay 49STL via contacts 3 of relay RST whereas in application Serial No. 394,339 this connection is direct. The multiple address director, therefore, sends the foreign system code to the foreign system via lead 25, after which the fans release and the outlet is blinded. Release of the fans removes ground from the winding of relay 51–OP1 due to the release of the hold magnets and thereby releases relay SWA at contacts 2 of relay SW. The release of relay SWA permits operation of the relay SWB, the operating path extending from negative potential through winding of relay SWB, contacts 5 of relay SW and contacts 2 of relay SWA to ground. The connection through to outlet 25 of foreign system No. 1 is therefore severed at contacts 1 of relay SWA and contacts 1 of relay SWB.

In the manner described in the aforementioned application Serial No. 394,339, the multiple address director now scans the following code setting up the fans in the usual manner. Ground is again applied to the winding of relay 51–OP1 via the fan hold magnets shown in FIG. 42, but since relay SW is operated relay SWA operates via the path created at contacts 2 of relay SW. Reoperation of relay SWA and the consequent opening of the contacts 2 thereof opens the energization circuit for relay SWB as hereinbefore traced. When relay SWB releases ground is again connected directly to foreign system outlet 25 via contacts 2 of relay SW, contacts 1 of relay SWA, contacts 1 of relay SWB, and contacts 1 of relay FS1. The outlet is therefore unblinded and the foreign system again responds over lead 63—17 in the manner described in the aforementioned application. The multiple address director then transmits the code to the outlet for foreign system No. 1, subsequent to which the fans again release and the outlet is again blinded. This identical procedure is performed on each code until another intersystem code is scanned or until the combinations for Carriage Return and Line Feed are scanned in succession.

When one of the codes scanned sets up the final fan to connect to a final code point representing an outlet associated with the home system, after a foreign system outlet has been seized, there is no effect upon that outlet. This is due to the existence of negative battery applied to the outlet via resistor 24, contacts 2 of operated relay SWB, contacts 3 of relay SW, and apex 22. This battery encounters the negative potential, fully described in patent application Serial No. 394,339, existing at such an outlet and nullifies its effect. Although not referred to in tracing the circuits emanating from negative potential through resistor 24, it should be recognized that this path is also via contacts closed upon operation of the fan hold magnets shown in FIG. 42.

When it is desired to switch to another foreign system, the intersystem code for that system is inserted in the tape at the transmitting point. When this code is scanned by the multiple address director, the fan circuit is set up in the usual manner. Relay SWA operates from negative battery through its windings, contacts 2 of relay SW, the winding of relay 51–OP1, to ground via the fan hold magnet contacts. Relay SWB, due to the opening of its energization circuit at contacts 2 of relay SWA begins to release. Due to the slow release of relay SWB, there is necessarily a delay before ground can be applied through the winding of relay 51–OP1, contacts 1 of relay SWA, contacts 1 of relay SWB, and contacts 1 of the foreign system relay associated with the outlet selected, to that outlet. During this delay, negative battery is being applied through resistor 24, contacts 2 of relay SWB, contacts 3 of relay SW, and apex 22 to the final code point representative of the particular foreign system selected by final fan 21. This negative potential serves additively with the positive potential on the lower winding of the FS relay associated with the foreign system under consideration, to energize that relay, and as the locking path of each FS relay includes normally closed contacts of all other FS relays this energization results in the deenergization of any previously locked FS relay.

For a more concise explanation, assume that subsequent to transmission of the address codes to foreign system No. 1, the intersystem code for foreign system No. 2 is read by the multiple address director. Negative battery through resistor 24, contacts 2 of yet unreleased relay SWB, contacts 3 of relay SW, and apex 22 is applied to final code point 26 from which point, due to application of positive potential to the lower winding of relay FS2, relay FS2 operates. Operation of relay FS2 opens the one-and-one-only circuit which provides the locking path for relay FS1. This circuit comprises, as hereinbefore recited, negative potential, winding and contacts 3 of relay FS1, contacts 5 of relay FS*n*, through similar contacts of all intermediate FS relays, through previously-closed contact 4 of relay FS2, contact 4 of relay FS1 to ground via contacts 11 of operated relay 40–ON1. While opening the locking circuit of relay FS1, relay FS2 simultaneously establishes such a circuit for itself extending from negative battery through its upper winding and contacts 3, contacts 5 of relay FSN, through similar contacts of all intermediate FS relays, contacts 5 of relay FS2, contacts 5 of relay FS1, through contacts 11 of relay 40–ON1 to ground. Following its time delay, when relay SWB now releases the ground is connected via contacts 2 of relay SW, contacts 1 of relay SWA, contacts 1 of relay SWB, and contacts 1 of relay FS2 to outlet 27 to foreign system No. 2. Subsequent codes are therefore transmitted to foreign system No. 2 in the same manner as hereinbefore described with respect to foreign system No. 1 connections.

When the director scans the code combination for Carriage Return of the two successive code combinations for Carriage Return and Line Feed, indicative of the end of addresses, relay 40–ON1 releases as described in detail in the aforementioned patent application. Upon release, the locking circuit for any operated FS relay is opened at contacts 11 thereof. If, for example, we assume that relay FS2 was previously operated, its locking path comprises negative supply, the windings and contacts 3 thereof, contacts 5 of relay FS*n*, similar contacts of intermediate FS relays, contacts 5 of relay FS2, contacts 5 of relay FS1, and contacts 11 of relay 40–ON1. The locking circuit of relay SW is similarly opened, it being recalled that this circuit comprised negative supply through the windings and contacts 4 thereof, and contacts 11 of relay 40–ON1, to ground. The system interconnecting circuitry is thus returned to normal.

Means are also provided in the embodiments of this invention whereby a code combination may be discarded when it is desired not to transmit it to a foreign system. This means is separated from the circuitry thus far described by representative switches 28, 29, and 30, and is provided by relay RST. When discarding is contemplated, the switch associated with the particular foreign system is closed; thus when ground is applied to a final code point, such as 23, preparatory to seizing a particular outlet, in this case via lead 25, relay RST is energized. The energizing path comprises positive potential, lower winding of relay RST, diode 31, final code point 23, apex 22, and then either to ground via contacts 1 of relay SW, winding of relay 51–OP1 and the second fan hold magnet contacts, or to negative potential via contacts 3 of relay SW, contacts 2 of relay SWB, and resistor 24. The particular path is determined by whether or not relay SW is operated. Relay RST thereupon locks through its upper winding in a circuit comprising negative polarity, the upper winding and contacts 1 thereof, and the ground appearing at contacts 2 of relay SW via the winding of relay 51–OP1. Operation of relay RST opens, at contacts 3, the circuit extending from the outlet of the addressed foreign system back to relay 49STL which controls the transmission of foreign system addresses. Thus, when ground is applied at the foreign system outlet and thence to lead 63—17 indicative of its readiness to receive such codes, relay 49STL is disconnected and cannot respond. When relay RST is operated, however, upon release of relay SWB ground via contacts 2 of relay SW, contacts 2 of the relay FS1, contacts 3 of relay SWB, and contacts 2 of relay RST is applied to relay 49DC of the director, causing the director to discard the foreign intersystem code and scan the next code in the tape. As the fans are broken down subsequent to each decoding, the locking circuit for relay RST opens and relay RST therefore releases.

The embodiments of this invention also make provision for the interception of messages that are improperly addressed. After connection has been made to an intersystem trunk if a code is scanned, the first character of which should add multiple address intercept, the intercept circuit is added in the usual manner by the operation of relay 39IC in the multiple address circuit. The operation of this relay is fully disclosed in application Serial No. 394,339. Operation of relay 39IC closes newly added contacts 3 which serve to lock relay SWB by a path from negative potential through the windings thereof, contacts 5 of relay SW, and contacts 3 of relay 39IC to ground. This insures that connection to foreign system outlets will not be made, as contacts 1 of relay SWB are kept open. Since the character count of the multiple address director is normal, any following codes will be sent to the outlet as well as to the multiple address intercept circuit. In the manner described in the aforecited application, if the first character of the code is Letters it is discarded by the multiple address director. The following character (normally the second of the code) is registered in the first fan and the second (normally Letters) is registered in the second fan. This results in adding multiple address intercept but since the character count of the director is no longer normal the outlet remains blinded and succeeding codes are not sent to it.

In the event that the second character of a code is one which should add multiple address intercept, the character sets up the fan circuit as described in the aforementioned application and in the usual manner causes the operation of relay 51BS. It should be noted that in application Serial No. 394,339 relay 51BS is energized when the multiple address intercept is called in by a negative potential applied to both of its windings. When utilizing this invention this negative potential is replaced by conductor 35 which is connected to armature 9 on the SW relay. Thus, when an erroneous second character causes the fan circuit to be so set, negative potential via resistor 24, hold magnet contacts 1, contacts 2 of relay SWB, contacts 3 of relay SW, apex 22, fan circuit 21 to the incorrect final code point and subsequently in the fashion described in the application Serial No. 394,339 over either conductor 42—24 or 42—26 to the windings of relay 51BS and thence over conductor 35 through contacts 8 to ground which operates relay 51BS. When operated, relay 51BS establishes a path to hold relay SWB operated so that connection cannot be made to foreign system outlets. This locking path for relay SWB is from negative potential through the windings thereof, contacts 5 of relay SW, and added contacts 3 of relay 51BS to ground.

Since the character count of the director is normal, any following codes are sent to the outlet as well as to the multiple address intercept.

Under normal operation, once the home system stations have been addressed and foreign system addresses have been perforated in the tape, home system codes should no longer be impressed thereon. However, if a home system code should be used in error, multiple address intercept will be added in the fashion described in patent application Serial No. 394,339. If the code appears prior to the operation of relay SW, ground on final code point 39 derived via the hold magnet contacts, winding of relay 51–OP1, contacts 1 of relay SW, apex 22, and fan circuit 21, will be connected to the conductor 32 via contacts 7 of relay SW. This conductor is connected directly to 51—23. If the code appears after operation of relay SW, battery via resistor 24, hold magnet contacts 1, contacts 2 of relay SWB, contacts 3 of relay SW, apex 22, fan circuit 21, and final code point 39, will be connected via contacts 6 of relay SW to relay HS and subsequently ground. Relay HS then operates. Operation of relay HS provides a holding path for relay SWB via contacts 2 and also connects a ground to conductor 32 which, as previously described, will result in the addition of the multiple address intercept. Upon establishment of this connection, the fan circuit will be released and relay HS will be released.

The complete operation of the illustrative embodiment of this invention depicted in FIG. 2 having been described, it is unnecessary to describe the illustrative embodiment in FIG. 3 in such detail. The embodiments are basically the same, the difference lying as previously pointed out in the compatibility of the one in FIG. 2 with the system disclosed in patent application Serial No. 394,339 and the compatibility of the embodiment of FIG. 3 with the system disclosed in Patent 2,766,318. The circuitry in FIG. 3 therefore has been modified to handle a different nature of information appearing on the final code points. It will be recalled that in FIG. 2 when a final code point was selected, ground was applied thereto. In FIG. 3, as has been described in Patent 2,766,318, the selection of a final code point may be indicated by the appearance thereon of either a positive or a negative potential. In order to accommodate this changed condition, relays FS1A and FS2A through FS*n*A, have been added. The function of these relays is to apply an operating ground to relays FS1, FS2 through FS*n* respectively, in the same manner as such a ground was applied in the embodiment of FIG. 2.

It will be noted that in FIG. 3 the apex of fan circuit 36 is connected to conductor 105–48 as illustrated in the patent identified in the foregoing. However, inserted between this connection and the test SFO key illustrated in FIG. 105 of the patent is the apparatus of this invention. The circuit as shown in FIG. 3, therefore, is from the test SFO key to conductor 105–48(2), contacts 1 of relay SW, conductor 37 and conductor 105–48(1) to the apex. When the fan circuit is set up in accordance with a particular code, either a positive or negative potential is applied over conductor 105–48 to the particular final code point selected.

As an illustration of the actual operation of the circuitry in FIG. 3, assume for example that the code for foreign system No. 1 is received. Fan circuit 36 will be set up in the fashion to select final code point 33 resulting in the establishment thereat of either a positive or a negative potential. This potential applied through relay FS1A and contacts 9 of relay SW to ground results in the operation of relay FS1A. Upon operating, contacts 1 of relay FS1A apply ground to the lower winding of relay FS1, the other side of which is connected to a negative potential. Relay FS1 therefore operates and in the fashion described with reference to FIG. 2, a bid is made to the foreign system outlet associated with foreign system No. 1 which in this case is made via lead 38. The path over which this bid is made is from conductor 105–48(2) through contacts 2 of relay SW, contacts 4 of relay SWA, contacts 1 of relay SWB, and contacts 1 of relay FS1. The operation of each relay takes place in the same sequence as that previously described in reference to FIG. 2. Changes have been made in the circuitry to accommodate the appearance of the positive or negative potential on the final code points where ground was previously employed.

To make possible the operation of this invention with the system disclosed in Patent 2,766,318, connections have been made to the points therein, analogous to such points already considered in FIG. 2 as existing in the system of patent application Serial No. 394,339. Some direct substitution has been made, these cases being relay 105—01 for relay 40–ON1, relay 106—27 for relay 49STL, discard relay 105—49 for relay 49DC, and relay 105—19 for relay 39IC. In addition, relay 105—76 has been substituted for relay 51BS. These substituted relays are employed to perform functions similar to those performed by the relays appearing in FIG. 2. They operate in a sequence similar to that previously described and as their inclusion affects merely the compatibility of the invention with the previous disclosure of the patent, a more detailed description of their operation is considered unnecessary.

It should be appreciated that the embodiments of this invention make possible the provision of a flexible telegraph network with simplicity and a minimum of circuit change, and afford results heretofore unattained. The foregoing description is merely an illustration of two embodiments of the invention and is not intended to limit the invention to these illustrative embodiments.

What is claimed is:

1. In a multisystem telegraph network wherein each system is assigned a distinct system designation comprising permutation code combinations, a plurality of stations within each system each assigned individual station designations comprising permutation code combinations, first directing means within each system controlled by plural station designations for directing subsequent messages to the plurality of stations designated thereby, and additional directing means within each system controlled by said system designations for directing subsequent station designations to the system designated thereby.

2. In a multisystem telegraph network wherein each system is assigned a distinct system code comprising permutation code combinations, a plurality of stations within each system each assigned individual station codes comprising permutation code combinations, selective switching apparatus within each system controlled by a permutation code for directing subsequent codes to succeeding switching apparatus when there is a plurality of said subsequent codes, and a fan circuit within said succeeding switching apparatus controlled by said subsequent codes for directing a message to designated stations within the particular system and for directing station codes preceded by system codes to outlets to the system designated thereby.

3. In a multisystem telegraph network wherein each system is assigned a distinct system designation comprising permutation code combinations, a plurality of stations within each system each assigned individual station designations comprising permutation code combinations, identical station designations being assignable to stations in other systems a multiple address circuit within each system, selective switching apparatus within each system controlled by a permutation code combination for directing subsequent code combinations and messages to said multiple address circuit, means for storing said messages in said multiple address circuit, first directing means controlled by said station designations for directing said messages to all stations designated thereby, and second directing means controlled by said system designations for directing subsequent station designations to the system designated by the preceding permutation code.

4. In a multisystem telegraph network wherein each system is designated by a system code, a plurality of stations within each system each designated by a station code, switching apparatus responsive to a permutation code combination for directing subsequent station and system codes to succeeding switching apparatus, an intersystem connecting circuit within said succeeding switching apparatus controlled by said system codes for forwarding all station codes subsequent thereto to the system designated thereby, a fan circuit within said succeeding switching apparatus controlled by said station codes when not preceded by a system code to direct a message to the stations designated thereby, said fan circuit further controlled by said system codes to enable said intersystem connecting circuit.

5. A multisystem telegraph network as defined in claim 4 wherein said intersystem connecting circuit comprises switching means individual to each of said systems and selectively operative in response to the code designation of said systems to establish a connecting path thereto.

6. A multisystem telegraph network as described in claim 4 wherein said intersystem connecting circuit comprises first switching means individual to each of said systems and selectively operative in response to the code designation of said systems to establish a connecting path thereto, and second switching means operative in response to the operation of any of said first switching means for establishing a circuit through which all station codes subsequent to a system code may be transmitted to said established connecting path.

7. In a multisystem telegraph network wherein each system is assigned a distinct system designation comprising permutation code combinations, a plurality of stations within each system each assigned individual station designations comprising permutation code combinations, identical station designations being assignable to stations in other systems, switching apparatus responsive to a permutation code combination for directing subsequent station and system designations to succeeding switching apparatus, a fan circuit in said succeeding switching apparatus controlled by said station designations when not preceded by a system designation to direct a message to the stations designated, switch means in said succeeding switching apparatus individual to each of said systems, said fan circuit being controlled by said system designations to operate said switch means, relay means controlled by said switch means when operated to disable said fan circuit from directing messages to designated stations and to establish a first circuit including said operated switch means via which subsequent codes may be transmitted to the system, and means responsive to a second system designation for disconnecting said first circuit and establishing a second circuit via which subsequent station designations may be transmitted to said second system.

8. Circuitry for interconnecting independent telegraph systems having preexisting means for intrasystem connections in response to permutation code combinations comprising in combination, first switching means individual to each of said systems and individually operative in response to discrete system identifying permutation code combinations, second switching means controlled by said first switching means when operated to initiate the establishment of a connection to the system identified by said discrete code combination, said connection including said first switching means, first relay means controlled by said second switching means to blind said intrasystem connections upon occurrence of said discrete permutation code combinations, and second relay means controlled by said second switching means to provide a particular intrasystem connection when said discrete permutation code combination is not one of a predetermined group.

9. Circuitry as defined in claim 8 wherein said first switching means includes means for disconnecting said established connection operative in response to a second discrete permutation code combination.

10. Circuitry for interconnecting independent telegraph systems having pre-existing means for intrasystem connections in response to permutation code combinations comprising in combination, first switching means individual to each of said systems and individually operative in response to discrete system identifying permutation code combinations, second switching means individual to each of said systems and controlled by the respective ones of said first switching means, third switching means controlled by said second switching means when operated to initiate establishment of a connection to the system identified by said discrete code combination, said connection including said second switching means, first relay means controlled by said third switching means to blind said intrasystem connections upon occurrence of said discrete permutation code combinations, and second relay means controlled by said third switching means to provide a particular intrasystem connection when said discrete permutation code combination is not one of a predetermined group.

11. Circuitry of the nature defined in claim 10 wherein said second switching means includes means for disconnecting said established connection operative in response to a discrete permutation code combination identifying a second system.

12. A teletypewriter switching system comprising a plurality of central offices each individually designated by an address, a plurality of stations connected individually to each of said central offices, each of said stations individually designated by a station address other than that utilized for said central offices, connecting paths available between said stations individual to each central office, connecting paths between said central offices, means in each central office operative in response to said addresses for selectively establishing said connecting paths to the stations or to the other central offices designated thereby, and means operative when said other central offices are connected for automatically transmitting only the station addresses to a plurality of stations associated therewith to which a message is directed over said connecting paths.

References Cited in the file of this patent

UNITED STATES PATENTS

| | | |
|---|---|---|
| 2,501,063 | Levin | Mar. 21, 1950 |
| 2,505,728 | Zenner | Apr. 25, 1950 |
| 2,554,115 | Molnar | May 22, 1951 |
| 2,583,782 | Lomax | Jan. 29, 1952 |
| 2,667,533 | Zenner | Jan. 26, 1954 |
| 2,673,236 | Phelps | Mar. 23, 1954 |
| 2,766,318 | Bacon | Oct. 9, 1956 |
| 2,805,283 | Stiles | Sept. 3, 1957 |